United States Patent
Niemz

(10) Patent No.: US 9,381,851 B2
(45) Date of Patent: Jul. 5, 2016

(54) DEVICE AND METHOD FOR AUTOMATICALLY SETTING THE LUMINANCE OF A LIGHT BEAM EMITTED FROM A LIGHTING DEVICE OF A VEHICLE AS A FUNCTION OF THE RANGE OF VISION

(75) Inventor: Volker Niemz, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1265 days.

(21) Appl. No.: 12/736,755

(22) PCT Filed: Nov. 19, 2008

(86) PCT No.: PCT/EP2008/065790
§ 371 (c)(1),
(2), (4) Date: Jan. 24, 2011

(87) PCT Pub. No.: WO2009/135540
PCT Pub. Date: Nov. 12, 2009

(65) Prior Publication Data
US 2011/0116277 A1    May 19, 2011

(30) Foreign Application Priority Data

May 5, 2008 (DE) .......................... 10 2008 001 551

(51) Int. Cl.
*B60Q 1/02* (2006.01)
*B60Q 1/08* (2006.01)
*B60Q 1/26* (2006.01)

(52) U.S. Cl.
CPC .............. *B60Q 1/085* (2013.01); *B60Q 1/2603* (2013.01); *B60Q 2300/054* (2013.01); *B60Q 2300/312* (2013.01)

(58) Field of Classification Search
CPC ........................ B60Q 2300/05; B60Q 2300/23
USPC .............. 315/77, 82; 362/460, 464, 465, 466; 307/10.1, 10.8
See application file for complete search history.

(56) References Cited

U.S. PATENT DOCUMENTS

| | | | |
|---|---|---|---|
| 5,938,319 A * | 8/1999 | Hege | 362/459 |
| 6,293,686 B1 * | 9/2001 | Hayami et al. | 362/465 |
| 7,092,007 B2 * | 8/2006 | Eguchi et al. | 348/148 |
| 7,233,233 B2 * | 6/2007 | Taniguchi et al. | 340/435 |
| 7,388,476 B2 * | 6/2008 | Nagaoka et al. | 340/436 |

(Continued)

FOREIGN PATENT DOCUMENTS

| | | |
|---|---|---|
| DE | 100 57367 | 5/2002 |
| DE | 102 05 184 | 8/2003 |

(Continued)

*Primary Examiner* — Thuy Vinh Tran
(74) *Attorney, Agent, or Firm* — Norton Rose Fulbright US LLP

(57) ABSTRACT

A device and a method for automatically setting the luminance of a light beam emitted from a lighting device of a vehicle as a function of the range of vision. The device includes a device for ascertaining a current range of vision based on at least one first parameter, which represents a dimension of the current range of vision, an evaluation device for evaluating the ascertained current range of vision (SI) based on at least one second parameter as the evaluation criterion and outputting a corresponding evaluation variable, and a setting device for assigning a required luminance as a function of the ascertained current range of vision (SI) and the corresponding evaluation variable and setting the required luminance.

13 Claims, 2 Drawing Sheets

(56) References Cited

U.S. PATENT DOCUMENTS

| | | | |
|---|---|---|---|
| 7,429,918 B2 * | 9/2008 | Watanabe | 340/468 |
| 2001/0030870 A1 * | 10/2001 | Hiramatsu et al. | 362/465 |
| 2005/0275562 A1 | 12/2005 | Watanabe | |
| 2008/0106204 A1 * | 5/2008 | Sato et al. | 315/77 |

FOREIGN PATENT DOCUMENTS

| | | |
|---|---|---|
| DE | 10 2006 011169 | 7/2006 |
| EP | 1 422 663 | 5/2004 |
| EP | 1 604 865 | 12/2005 |

* cited by examiner

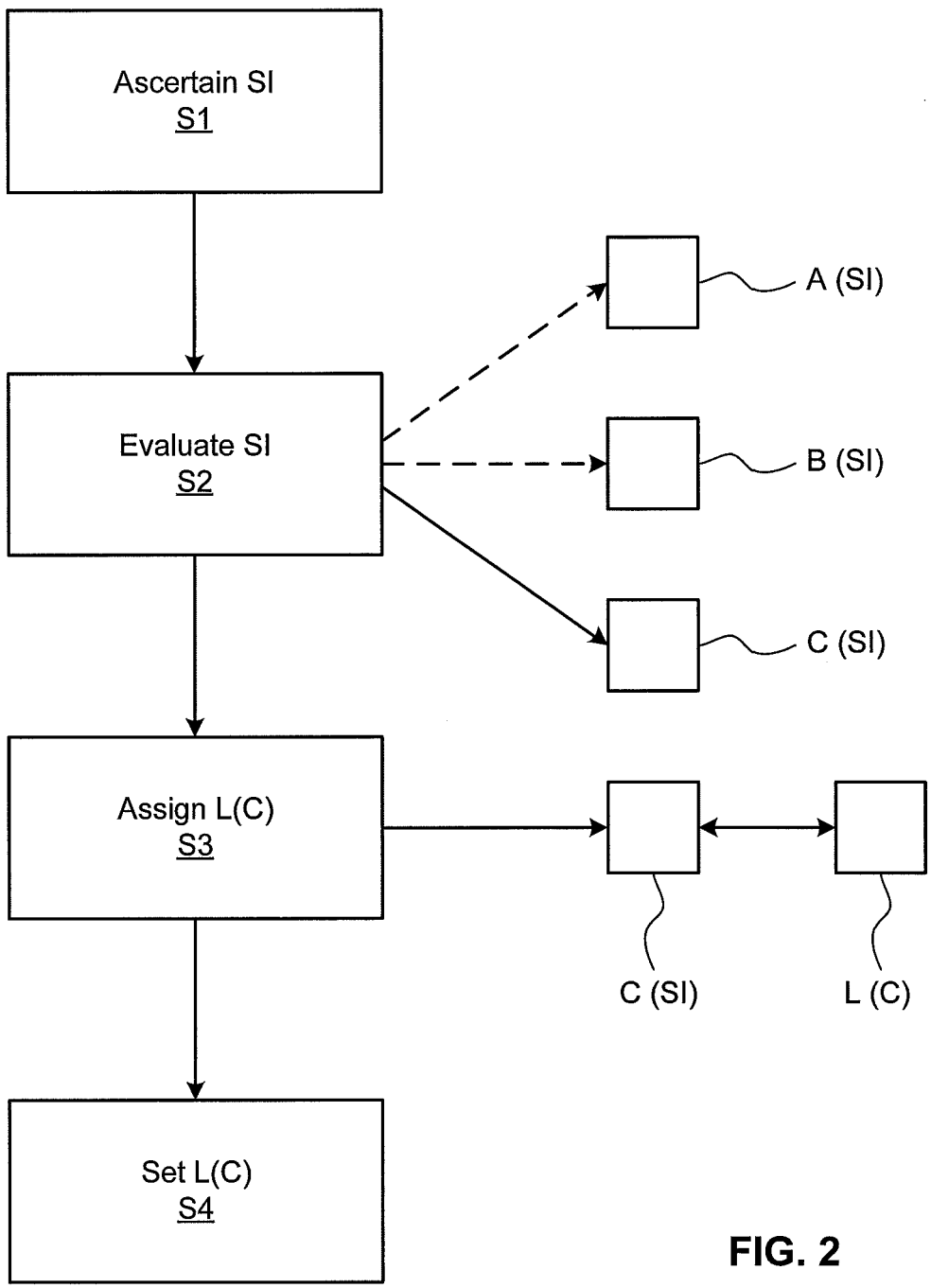

DEVICE AND METHOD FOR AUTOMATICALLY SETTING THE LUMINANCE OF A LIGHT BEAM EMITTED FROM A LIGHTING DEVICE OF A VEHICLE AS A FUNCTION OF THE RANGE OF VISION

CROSS-REFERENCES TO RELATED APPLICATIONS

This application is a National Stage of International Pat. App. No. PCT/EP2008/065790, and claims priority under 35 U.S.C. §119 to German patent application DE 10 2008 001 551.2, filed May 5, 2008.

FIELD OF THE INVENTION

The present invention relates to a device and a method for automatically setting the luminance of a light beam, emitted from a lighting device of a vehicle, as a function of the range of vision.

BACKGROUND INFORMATION

The traffic density in the worldwide road networks increases significantly every year. Freeways and expressways are particularly affected. In particular during bad weather, the full attentiveness of the driver is required to orient himself in traffic. The recognition of other road users in case of fog or high air humidity represents a big problem in particular. In this case, the other road users are often only recognizable with the aid of the existing headlights. Particularly the spray mist arising in wet weather causes the vehicle contours of the preceding vehicles and the following vehicles to blur, and the visibility may drop significantly in spite of activated headlights. Current developments allow the headlights to be turned on automatically as a function of the applicable light and weather conditions.

A device for automatically setting the luminance of a light beam emitted from at least one rear illumination device of a vehicle as a function of the brightness and the range of vision in the surroundings of the vehicle is known from DE 102 05 184 A1, which has a sensor device for ascertaining the brightness and the range of vision in the vehicle's surroundings.

SUMMARY OF THE INVENTION

The device according to the exemplary embodiments and/or exemplary methods of the present invention for automatically setting the luminance of a light beam emitted from a lighting device of a vehicle as a function of the range of vision and the corresponding method have the advantage that the safety may be improved further by an additional evaluation of the range of vision, since the visibility of one's own vehicle or other vehicles is increased depending on the situation.

The idea on which the exemplary embodiments and/or exemplary methods of the present invention are based is to regulate the vehicle illumination as a function of the prevailing light and weather conditions, the ascertained visibility or the ascertained range of vision being evaluated by at least one further parameter. In particular, the further parameter may be a vehicle parameter, such as the design of the vehicle body, current velocity, tire type, profile depth of the tires, age of the tires, inter alia. The further parameter may also be a driver parameter, such as age of the driver, eyesight of the driver, individual specification of the driver, etc.

Advantageous refinements of and improvements on the object of the exemplary embodiments and/or exemplary methods of the present invention are found in the description herein.

Exemplary embodiments of the present invention are shown in the drawings and are explained in greater detail in the following description.

BRIEF DESCRIPTION OF THE DRAWINGS

FIG. 2 shows a flow diagram to explain the method for automatically setting the luminance of a light beam emitted from a lighting device of a vehicle as a function of the range of vision according to the first specific embodiment of the present invention.

DETAILED DESCRIPTION

Figure 1:
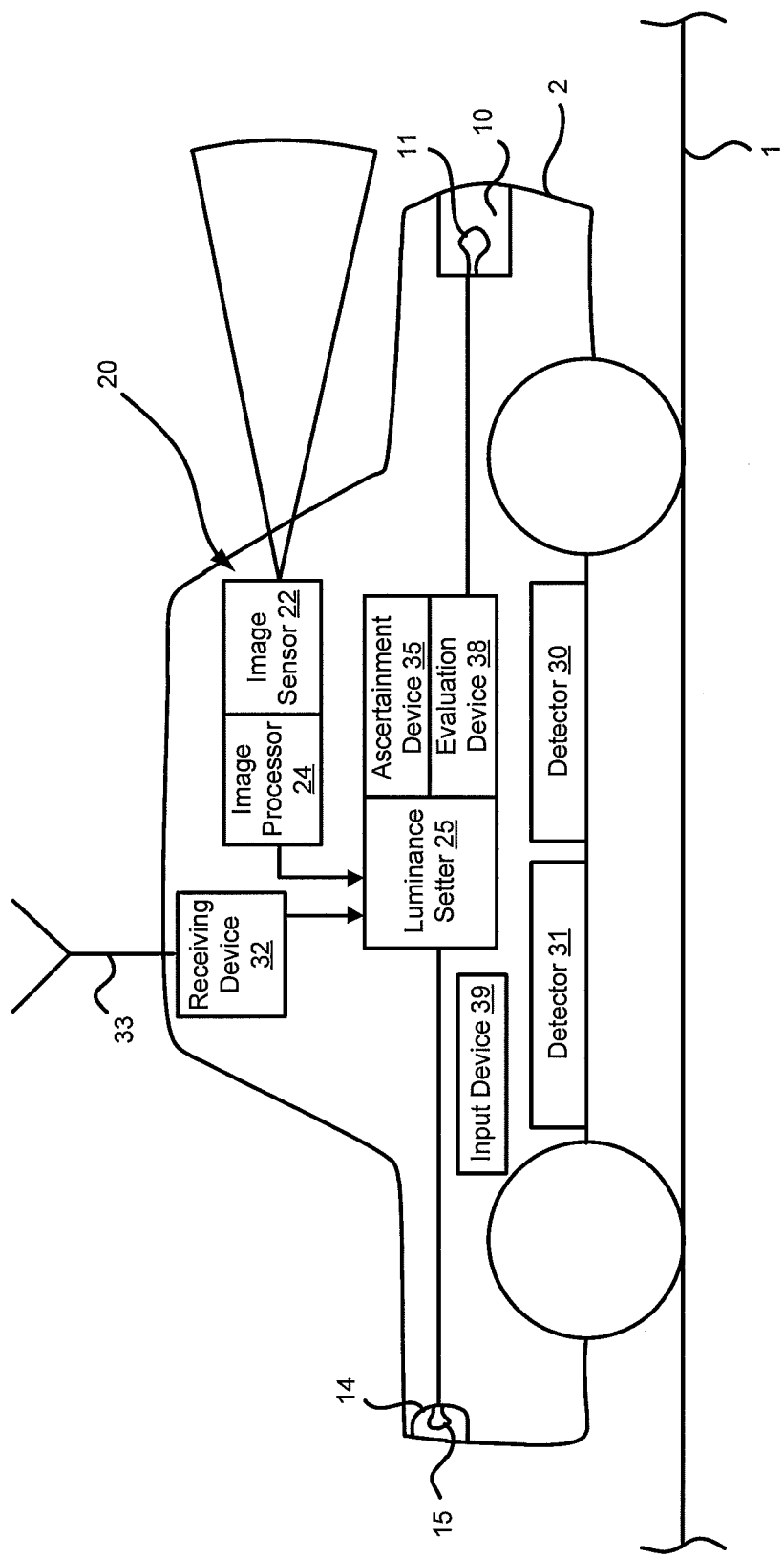
FIG. 1 shows a schematic block diagram of a vehicle having a device for automatically setting the luminance of a light beam emitted from a lighting device of a vehicle as a function of the range of vision according to a first specific embodiment of the present invention.

Identical reference numerals identify identical or functionally identical components in the figures.

FIG. 1 shows a schematic block diagram of a vehicle having a device for automatically setting the luminance of a light beam emitted from a lighting device of a vehicle as a function of the range of vision according to a first specific embodiment of the present invention.

In FIG. 1, reference numeral 1 refers to a roadway, on which a vehicle 2 is located. As lighting devices, vehicle 2 has a headlight 10 having a headlight lamp 11 in the front area and a taillight 14 having a rear lamp 15 in the rear area.

Reference numerals 25 refer to a device for automatically setting the luminance and the light emitted from headlight 10 and taillight 14. Device 25 receives data about the current range of vision from a temperature detection device 30, a humidity detection device 31, a weather information receiving device 32, which is connected to an antenna 33, and a video device 20, which has an image sensor 22 and an image processing device 24, as described, for example, in DE 102 05 184 A1.

A range of vision ascertainment device 35 provided in setting device 25 ascertains the current range of vision from the signals of these devices 30, 31, 32, 20.

In this process, the current range of vision is first determined based on the outside temperature as ascertained by device 30, and the outside humidity as ascertained by device 31. The initially generated range of vision or weather indication may be verified and, if necessary, corrected by an additional video image analysis with the aid of device 20 as well as weather information received by device 32. Scenarios such as fog, rain, snow, and other weather conditions may thus be detected solidly and reliably.

Furthermore, in FIG. 1, reference numeral 38 refers to an evaluation device provided in setting device 25, for evaluating the particular current range of vision ascertained by ascertainment device 35. The evaluation may be performed in consideration of at least one vehicle parameter, such as velocity, vehicle body design, tire type, profile depth, tire age, . . . , or vehicle parameter, such as age of the driver, eyesight of the driver, individual specification of the driver, etc.

Since such parameters vary from vehicle to vehicle or change in the course of time in a specific vehicle, an input device 39 is provided, using which the vehicle parameters or driver parameters may be input automatically and/or manually in accordance with a particular situation.

In the present exemplary embodiment, it is assumed that the relevant vehicle parameter is the profile depth of the tires. It is immediately obvious that new tires having a great profile depth place fewer demands on one's own visibility or range of vision than old, strongly worn tires having lesser profile depth. Accordingly, a stronger luminance is required at the same range of vision for old, worn tires than for new tires, which have a high profile depth.

In a variant of the exemplary embodiment, it is additionally or alternatively assumed that the relevant vehicle parameter is the current velocity of the vehicle. The greater the current velocity of the vehicle, the greater the swirling of the water on the road and thus the dense spray mist caused thereby. Accordingly, at equal range of vision, a stronger luminance is required at higher velocities than at lower velocities. Alternatively or additionally, it is assumed that the relevant vehicle parameter is the design of the rear area of the vehicle. The swirling of the water on the road occurs to varying extents depending on the design of the rear area of the vehicle.

After completed assignment of a required luminance as a function of the ascertained current range of vision and the evaluation by evaluation device 38, setting device 25 sets the luminance of headlight 10 and taillight 14, this setting being able to be performed independently for headlight 10 and taillight 14 in accordance with a table of previously stored data; for example.

FIG. 2 shows a flow diagram to explain the method for automatically setting the luminance of a light beam emitted by a lighting device of a vehicle as a function of the range of vision according to the first specific embodiment of the present invention.

In FIG. 2, S1 refers to a first step of ascertaining a current range of vision SI by ascertainment device 35 based on the parameters of devices 30, 31, 32, and 20.

In step S2, the ascertained current range of vision is evaluated based on the vehicle parameters or driver parameters, which is the profile depth in the present case.

Specifically, there is a small profile depth in the present case, for which reason evaluation variable C (SI) is assigned to ascertained current range of vision SI. If a moderate profile depth existed, value B (SI) would be assigned, and if a high profile depth existed, value A (SI) would be assigned.

A luminance L(C) used as the control variable for setting device 25, which sets this luminance L(C) in step S4 at headlight 10 and/or taillight 14, is then assigned in step S3 based on a previously stored table of evaluation variable C(SI).

It is fundamentally true for the previously stored control values for setting device 25 that the worse the vision conditions or the worse the state of the vehicle or the worse the state of the driver, the higher the light intensity is to be set to make one's own visibility optimal for oneself and other road users. In contrast thereto, in the event of good vision conditions or good state of the vehicle or good state of the driver, the light intensity is to be reduced to a minimum amount.

Although the present invention was described above based on the exemplary embodiments, it is not restricted thereto, but is rather modifiable in manifold ways.

In particular, the specified sensor types are only exemplary, and any desired sensors may be used for ascertaining the range of vision.

In general, it is to be noted that the light setting as a function of weather according to the exemplary embodiments and/or exemplary methods of the present invention may be performed both on the basis of light sources already provided in the vehicle, such as headlights and taillights, but may also be implemented using special auxiliary light sources. Thus, a targeted weather-related evaluated activation and setting of additional fog headlights or other weather headlights would also be conceivable.

The mentioned examples for the first and second parameters are also only exemplary.

What is claimed is:

1. A device for automatically setting a luminance of a light beam emitted from a lighting device of a vehicle as a function of the range of vision, comprising:
a range-of-vision device for ascertaining a current range of vision based on at least one first parameter, wherein:
each of the at least one first parameter represents a respective aspect of an environment in which the vehicle is located; and
the current range of vision is a distance from the vehicle in at least one direction up to which a driver is estimated to be able to see;
an evaluation device for evaluating the ascertained current range of vision based on at least one second parameter as an evaluation criterion and outputting a corresponding evaluation variable; and
a setting device for assigning a required luminance as a function of the ascertained current range of vision and the corresponding evaluation variable, and setting the required luminance.

2. The device of claim 1, wherein the second parameter is one of a vehicle parameter and a driver parameter.

3. The device of claim 2, wherein the second parameter is one of a design of the vehicle body, a current velocity, a tire type, a profile depth of the tires, and an age of the tires.

4. The device of claim 2, wherein the second parameter is one of an age of the driver, an eyesight of the driver, and an individual specification of the driver.

5. The device of claim 1, further comprising:
an input device for inputting the second parameter.

6. The device of claim 1, further comprising:
a video device for ascertaining the first parameter by video image analysis.

7. The device of claim 1, further comprising:
a weather information-receiving device for ascertaining the first parameter with the aid of weather information analysis.

8. The device of claim 1, further comprising:
a temperature detection device for ascertaining the first parameter with the aid of temperature analysis.

9. The device of claim 1, further comprising:
a humidity detection device for ascertaining the first parameter with the aid of humidity analysis.

10. The device of claim 1, wherein the setting includes setting a respective luminance for each of at least one headlight and at least one taillight.

11. A method for automatically setting a luminance of a light beam emitted by a lighting device of a vehicle as a function of the range of vision, the method comprising:
ascertaining a current range of vision based on at least one first parameter, wherein:
each of the at least one first parameter represents a respective aspect of an environment in which the vehicle is located; and
the current range of vision is a distance from the vehicle in at least one direction up to which a driver is estimated to be able to see;
evaluating the ascertained current range of vision based on at least one second parameter as an evaluation criterion and outputting a corresponding evaluation variable;

assigning a required luminance as a function of the ascertained current range of vision and the corresponding evaluation variable; and setting the required luminance.

12. The method of claim 11, wherein the setting includes setting a respective luminance for each of at least one headlight and at least one taillight.

13. A device for automatically setting a luminance of a light beam emitted from a lighting device of a vehicle as a function of the range of vision, comprising:

a computer processor configured to:

ascertain a current range of vision based on at least one first parameter, wherein:

each of the at least one first parameter represents a respective aspect of an environment in which the vehicle is located; and the current range of vision is a distance from the vehicle in at least one direction up to which a driver is estimated to be able to see;

determine at least one luminance value based on the ascertained current range of vision and at least one second parameter that characterizes at least one of a vehicle condition and a characteristic of a driver; and set a luminance of at least one illumination device based on the determined at least one luminance value.

* * * * *